Dec. 1, 1925.  
S. C. FORD ET AL  
1,564,173  
STORAGE BATTERY COMPARTMENT  
Filed March 3, 1924  
2 Sheets-Sheet 1
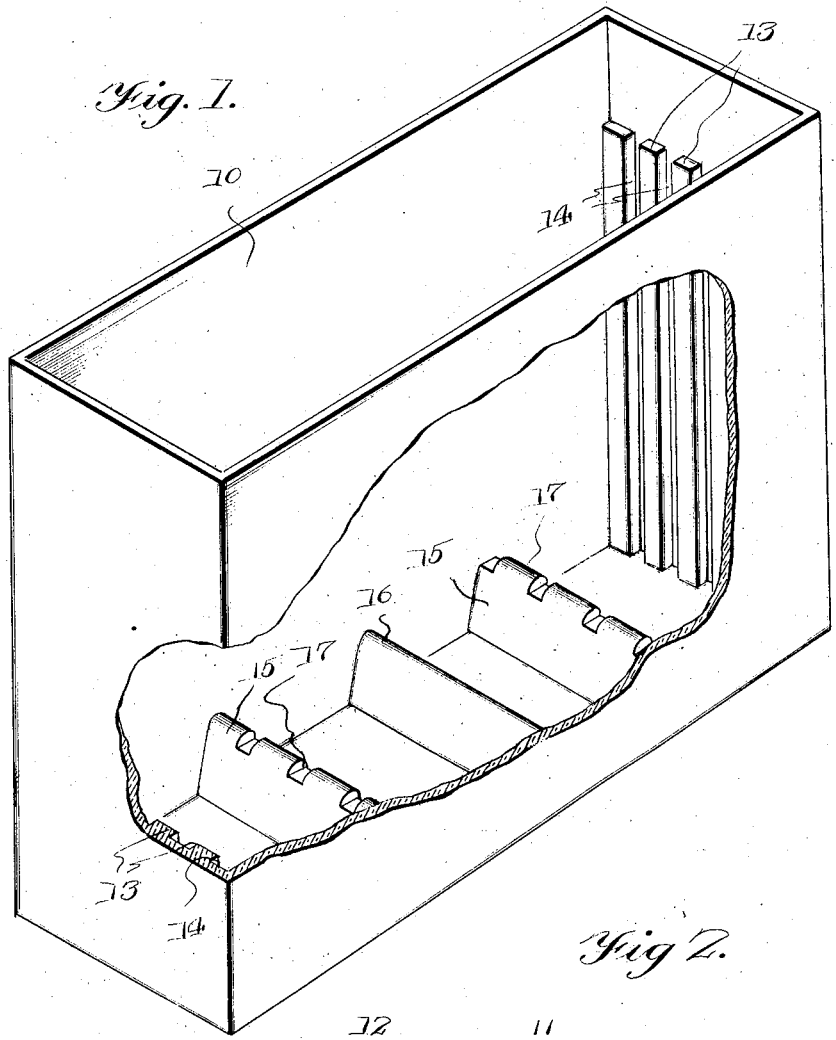
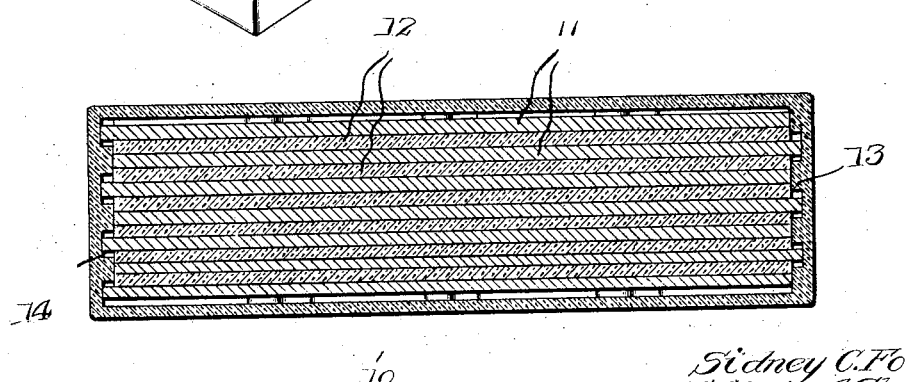
Sidney C. Ford  
William A. Shuler  
INVENTOR  
BY Victor J. Evans  
ATTORNEY

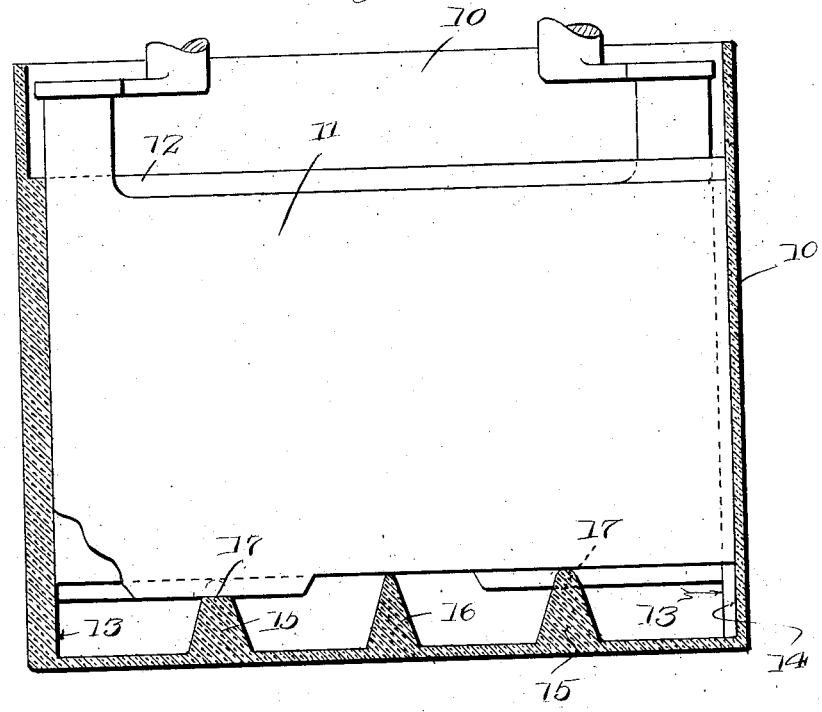
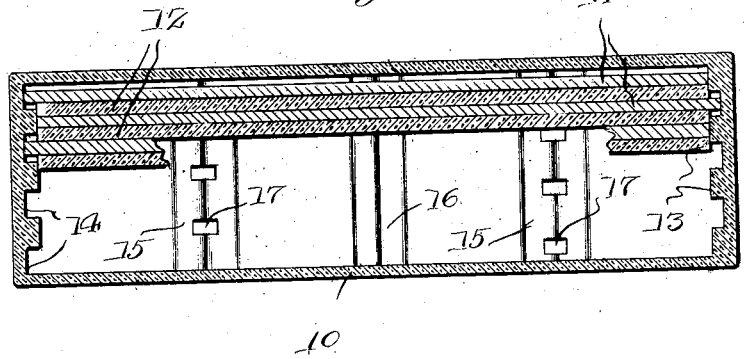

Patented Dec. 1, 1925.

1,564,173

UNITED STATES PATENT OFFICE.

SIDNEY CHARLES FORD AND WILLIAM ALFRED SHULER, OF NEW ORLEANS, LOUISIANA.

STORAGE-BATTERY COMPARTMENT.

Application filed March 3, 1924. Serial No. 696,578.

*To all whom it may concern:*

Be it known that we, SIDNEY C. FORD and WILLIAM A. SHULER, citizens of the United States, residing at New Orleans, in the parish of Orleans and State of Louisiana, have invented new and useful Improvements in Storage-Battery Compartments, of which the following is a specification.

This invention relates to improvements in storage batteries and has for an object the provision of a novel cell or compartment wherein means are provided for holding the plates and separators in position, whereby they will be maintained in proper spaced relation without pressure upon the separators, so that the life of the battery elements will be materially increased.

With the above and other objects in view, the invention further includes the following novel features and details of construction, to be hereinafter more fully described, illustrated in the accompanying drawings and pointed out in the appended claim.

In the drawings:—

Figure 1 is a perspective view of a battery cell or jar partly broken away and the plates and separators removed.

Figure 2 is a horizontal section with the plates and separators in position.

Figure 3 is a vertical longitudinal section of the same.

Figure 4 is a horizontal section with some of the plates and separators removed.

Referring to the drawings in detail wherein like characters of reference denote corresponding parts, the reference character 10 indicates a battery cell or jar which may be made of any suitable material and of a size to receive the desired number of plates and separators, the plates being indicated at 11 and the separators at 12.

In order to space and hold the plates apart so as to reduce wear on the separators or mats, which frequently become worn at the corners and allow the plates to come together, the jar or cell 10 is provided with spacing means which may be formed integral with the walls of the jar or cell as shown, or may be separately formed and secured in place in any suitable manner. To accomplish this the opposite end walls of the cell or jar 10 are provided with vertically disposed spaced ribs 13 so as to provide spaced grooves 14 therebetween, the ribs upon one end wall being so disposed with respect to the ribs upon the opposite end wall that the grooves 14 in one wall will be directly opposite the ribs 13 of the opposite end wall.

In addition the bottom of the jar or cell has extending upwardly thereform spaced transversely arranged ribs 15 and 16, the former being notched as at 17 with the notches arranged in a line with the ribs 13 in the adjacent end wall.

The plates 11 and separators 12 are arranged in pairs with one side edge of one plate and one separator positioned within one of the grooves 14 with their opposite side edges arranged adjacent one of the ribs 13 at the opposite end of the cell, while the lower edges of the ribs and separators are disposed within the notches 17 of the ribs 15. Each pair of plates and separators are thus held in proper position with respect to the next adjacent pair so that any tendency of the plates to wear the edges or corners of the separators is prevented. The proper separation of the plates will thus be maintained and the life of the cell accordingly increased.

The invention is susceptible of various changes in its form, proportions and minor details of construction and the right is herein reserved to make such changes as properly fall within the scope of the appended claim.

Having described the invention what is claimed is:—

In a battery cell, vertically disposed spaced ribs extending along opposite walls of the cell, the ribs of one wall being offset laterally with respect to the ribs of the opposite wall and defining relatively offset grooves for receiving the edges of the cell elements, spaced vertically disposed ribs extending transversely of the bottom of the cell, and the last mentioned ribs being transversely notched to receive the lower edges of the cell elements, the notches of the transverse ribs being arranged in alignment to singly receive alternate cell elements and the notches of the opposed walls being arranged to receive alternate pairs of cell elements.

In testimony whereof we affix our signatures.

SIDNEY CHARLES FORD.
WILLIAM ALFRED SHULER.